US012626317B2

(12) United States Patent
Shattock et al.

(10) Patent No.: US 12,626,317 B2
(45) Date of Patent: May 12, 2026

(54) SYSTEM AND METHOD FOR CAPTURING AND AUTHENTICATING HUMAN-GENERATED INVENTIONS

(71) Applicant: Clear IP Ltd, Dublin (IE)

(72) Inventors: Richard Shattock, Dublin (IE); James Joyce, Dublin (IE)

(73) Assignee: Clear IP Ltd, Dublin (IE)

( * ) Notice: Subject to any disclaimer, the term of this patent is extended or adjusted under 35 U.S.C. 154(b) by 0 days.

(21) Appl. No.: 19/009,935

(22) Filed: Jan. 4, 2025

(65) Prior Publication Data

US 2025/0342543 A1     Nov. 6, 2025

(30) Foreign Application Priority Data

May 1, 2024    (IE) .................................. S2024/0245

(51) Int. Cl.
    *G06Q 50/18*          (2012.01)
    *G06F 21/31*          (2013.01)
(52) U.S. Cl.
    CPC ......... *G06Q 50/184* (2013.01); *G06F 21/316* (2013.01)
(58) Field of Classification Search
    CPC ...... G06Q 50/184; G06F 21/316; G06F 21/32
    See application file for complete search history.

(56) References Cited

U.S. PATENT DOCUMENTS

2012/0011359 A1*  1/2012  Etheridge ............... G06F 21/60
                                                  713/165
2014/0082694 A1*  3/2014  Sanghavi ................ G06F 21/31
                                                  726/2

2015/0007289 A1    1/2015  Godse
2017/0098068 A1*   4/2017  Mantri .................. G06F 3/0346
2018/0089412 A1*   3/2018  Kopikare .............. G06F 40/174
2020/0007565 A1    1/2020  Gonzales, Jr.
2022/0414190 A1*  12/2022  Edwards ............. G06Q 20/388
2023/0012250 A1*   1/2023  Miller ..................... G06F 21/62

(Continued)

OTHER PUBLICATIONS

Lawrence Livermore National Laboratory, a System to Cryptographically Distinguish Between Human-Generated Text vs. AI-Generated Text, website, Mar. 23, 2023, Lawrence Livermore National Laboratory, Livermore, USA. (https://ipo.llnl.gov/technologies/it-and-communications/system-cryptographically-distinguish-between-human-generated).

*Primary Examiner* — Jessica Lemieux
*Assistant Examiner* — Alaa Wadie Hussein

(57) ABSTRACT

A computer-implemented method for capturing and authenticating human-generated inventions. The method involves initiating a timestamped invention capture event; prompting a user to move a mobile device in a predetermined sequence detected by a sensor; and authenticating the user based on successful detection of this movement sequence. Upon authentication, the method prompts the user to answer a series of invention-related questions in a multimodal format, recording each response in distinct, timestamped sections. The responses are stored in a database as a text file that includes time and date records of the invention capture event, creating a secure, verifiable record of user-generated invention data. The method further provides a reliable system for capturing and attributing inventions accurately, thereby supporting patent-related processes requiring authenticated human inventorship.

14 Claims, 4 Drawing Sheets

(56)          References Cited

U.S. PATENT DOCUMENTS

| | | | |
|---|---|---|---|
| 2023/0096720 A1* | 3/2023 | Wezowski | G06Q 10/0633 |
| | | | 705/7.42 |
| 2024/0243919 A1* | 7/2024 | Olsen | H04L 9/3239 |
| 2024/0296288 A1 | 9/2024 | Bitton et al. | |
| 2025/0307376 A1* | 10/2025 | Brown | G06F 21/44 |

* cited by examiner

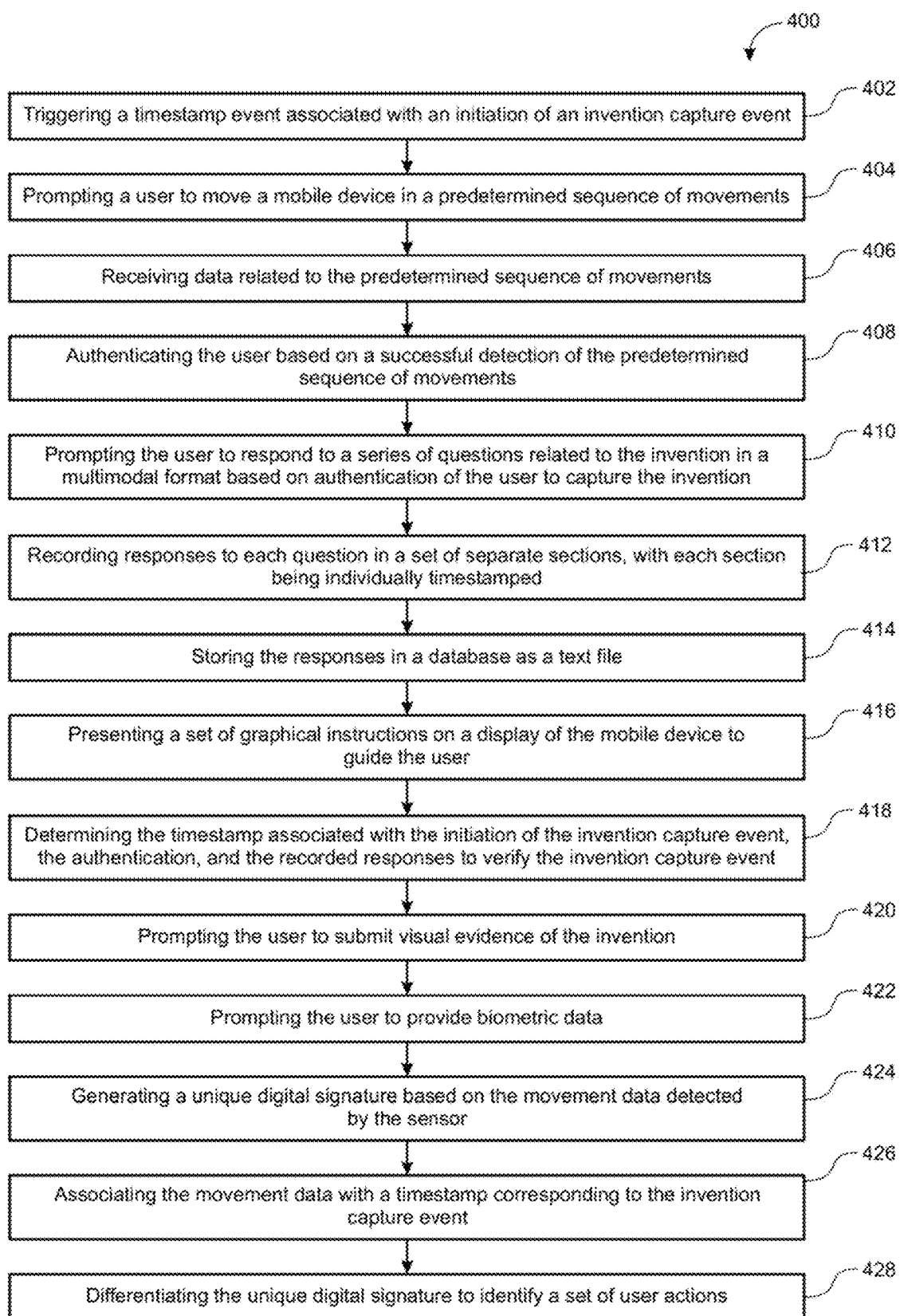

400

402 — Triggering a timestamp event associated with an initiation of an invention capture event 404 — Prompting a user to move a mobile device in a predetermined sequence of movements 406 — Receiving data related to the predetermined sequence of movements 408 — Authenticating the user based on a successful detection of the predetermined sequence of movements 410 — Prompting the user to respond to a series of questions related to the invention in a multimodal format based on authentication of the user to capture the invention 412 — Recording responses to each question in a set of separate sections, with each section being individually timestamped 414 — Storing the responses in a database as a text file 416 — Presenting a set of graphical instructions on a display of the mobile device to guide the user 418 — Determining the timestamp associated with the initiation of the invention capture event, the authentication, and the recorded responses to verify the invention capture event 420 — Prompting the user to submit visual evidence of the invention 422 — Prompting the user to provide biometric data 424 — Generating a unique digital signature based on the movement data detected by the sensor 426 — Associating the movement data with a timestamp corresponding to the invention capture event 428 — Differentiating the unique digital signature to identify a set of user actions

FIG. 4

SYSTEM AND METHOD FOR CAPTURING AND AUTHENTICATING HUMAN-GENERATED INVENTIONS

RELATED APPLICATION AND INCORPORATION BY REFERENCE

This application claims the benefit of priority under 35 U.S.C. § 119(a) to Irish Short-Term Patent Application No. S2024/0245, entitled "System and Method for Capturing and Authenticating Human-Generated Inventions," filed on May 1, 2024. The entire disclosure of the prior application is incorporated herein by reference in its entirety.

FIELD OF THE INVENTION

The present invention relates generally to data processing, and more specifically to systems and methods for capturing and authenticating human-generated inventions.

BACKGROUND

The integration of artificial intelligence (AI) into creative and inventive processes has advanced rapidly, leading to transformative developments across multiple fields. As AI systems increasingly contribute to the generation of new technologies, systems, and methods, distinguishing between inventions created by humans and those significantly assisted or generated by AI has become challenging. This distinction is critical in the domain of intellectual property rights, where patent eligibility traditionally requires a human inventor.

Current solutions lack mechanisms to verify the human origin of an invention, a gap that presents both legal and ethical challenges. Many jurisdictions do not recognize AI-generated inventions as patentable without a human inventor, and as AI's capabilities expand, its potential to autonomously generate inventive solutions underscores the need for a reliable method to authenticate human involvement in the inventive process. This is essential to uphold the integrity of patent systems and ensure adherence to legislative frameworks that mandate human inventorship.

Thus, there is a need for a system and method that can reliably capture and authenticate inventions, clearly distinguishing those derived from human intellectual contributions from those generated by AI. Such a system would support the enforcement of existing patent laws requiring human inventorship, thereby maintaining the patent system's role in incentivizing human innovation. The proposed system and method address these issues by providing a reliable means to capture and authenticate inventions based on the degree of human involvement, thereby ensuring correct attribution and compliance with human inventorship requirements.

Thus, in view of the above, there is a long-felt need in the industry to address the aforementioned deficiencies and inadequacies.

SUMMARY

According to an embodiment of the disclosure, a computer-implemented method for capturing and authenticating human-generated inventions is described. The computer-implemented method includes triggering, by a computer, a timestamp event associated with the initiation of an invention capture event. The computer-implemented method further includes prompting, by the computer, a user to move a mobile device in a predetermined sequence of movements. The computer-implemented method includes receiving, by the computer, data related to the predetermined sequence of movements. The mobile device includes a sensor such as an inertial measurement device that is configured to detect the predetermined sequence of movements. The computer-implemented method further includes authenticating, by the computer, the user based on a successful detection of the predetermined sequence of movements. The computer-implemented method includes prompting, by the computer, the user to respond to a series of questions related to the invention in a multimodal format based on the authentication of the user to capture the invention. The computer-implemented method includes recording, by the computer, responses to each question in a set of separate sections, with each section being individually timestamped. The computer-implemented method further includes storing, by the computer, the responses in a database as a media file. Examples of the media file include but are not limited to a text file, an audio file, a video file, an image file, and an animation file. The text file includes a record of the invention capture event comprising at least one of a time event and a date event.

According to one or more embodiments of the disclosure, a system for capturing an invention and authenticating an inventor is described. The system includes a processor set; a computer-readable storage media; and program instructions that are stored on the one or more computer-readable storage media. The program instructions are executable by the processor set to cause the processor set to trigger a timestamp event associated with an initiation of an invention capture event. The program instructions further cause the processor set to prompt a user to move a mobile device in a predetermined sequence of movements. The program instructions further cause the processor set to receive data related to the predetermined sequence of movements. The mobile device includes a sensor (such as an inertial measurement device) configured to detect the predetermined sequence of movements. The program instructions further cause the processor set to authenticate the user based on a successful detection of the predetermined sequence of movements. The program instructions further cause the processor set to prompt the user to respond to a series of questions related to the invention in a multimodal format based on authentication of the user to capture the invention. The program instructions further cause the processor set to record responses to each question in a set of separate sections, with each section being individually time stamped. The program instructions further cause the processor set to store the responses in a database as a media file. Examples of the media file include but are not limited to a text file, an audio file, a video file, an image file, and an animation file. The text file comprises a record of the invention capture event comprising at least one of a time event and a date event.

According to one or more embodiments of the disclosure, a computer program product for capturing an invention and authenticating an inventor is described. The computer program product includes a computer-readable storage media having program instructions stored on the computer-readable storage media to perform operations. The operations include triggering a timestamp event associated with the initiation of an invention capture event. The operations further include prompting a user to move a mobile device in a predetermined sequence of movements. The operations further include receiving data related to the predetermined sequence of movements. The mobile device includes an inertial measurement device that is configured to detect the predetermined sequence of movements. The operations further include authenticating the user based on a successful detection of the predetermined sequence of movements. The operations further include prompting the user to respond to a series of questions related to the invention in a multimodal format based on the authentication of the user to capture the invention. The operations further include recording responses to each question in a set of separate sections, with each section being individually timestamped. The operations further include storing the responses in a database as a media file.

Additional technical features and benefits are realized through the techniques of the disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following description will provide details of preferred embodiments with reference to the following figures wherein:

FIG. 4 is a flowchart that illustrates a method for capturing and authenticating human-generated inventions, in accordance with an embodiment of the disclosure.

DETAILED DESCRIPTION

Figure 1:
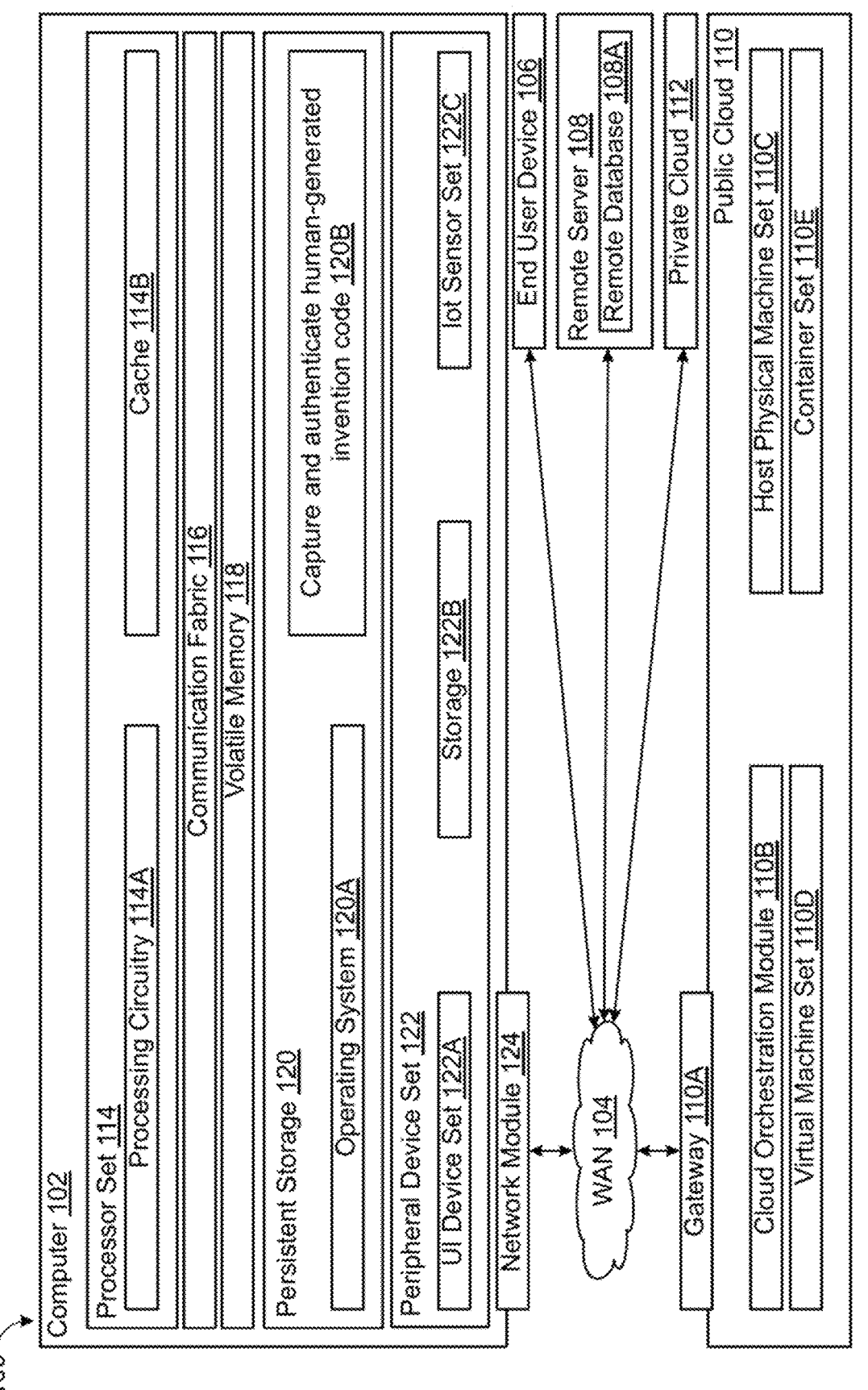
FIG. 1 is a diagram that illustrates a computing environment for capturing and authenticating human-generated inventions, in accordance with an embodiment of the disclosure.

The proposed system and method capture and authenticate human-generated inventions, ensuring inventorship verification and distinguishing between human and AI contributions. Utilizing a mobile device equipped with a specialized software application, the system prompts the inventor to complete a unique authentication procedure that requires specific phone movements. An integrated accelerometer or inertial measurement unit (IMU) detects these movements, generating a unique digital signature linked to the inventor's actions. During the invention capture event, the system records audio or text inputs and monitors fluctuations in device movement, associating each movement with the recorded input. By timestamping and matching accelerometer data with audio or text entries, the system provides a robust, verifiable record of the inventor's actions throughout the capture process. This innovation addresses the need for reliable authentication of human inventorship, supporting legal and regulatory frameworks that recognize only human contributions in patent filings.

Various aspects of the disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 is a diagram that illustrates a computing environment for capturing and authenticating human-generated inventions, in accordance with an embodiment of the disclosure. With reference to FIG. 1, there is shown a computing environment 100 that contains an example of an environment for the execution of at least some of the computer code involved in performing the disclosed methods, such as a capture and authenticate human-generated invention code 120B. In addition to the capture and authenticate human-generated invention code 120B, computing environment 100 includes, for example, a computer 102, a wide area network (WAN) 104, an end user device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A and the capture and authenticate human-generated invention code 120B, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 or computer system may take the form of a smartphone, tablets, smartwatches, laptops, desktop computers, smart TVs, a mobile phone, smart displays (e.g., Google Nest Hub, Amazon Echo Show), gaming consoles (e.g., PlayStation, Xbox, Nintendo Switch), Handheld Gaming Devices (e.g., Steam Deck, Nintendo Switch Lite), Virtual Reality (VR) Headsets, Augmented Reality (AR) Glasses, Smart Home Hubs (e.g., Amazon Echo, Google Nest), E-Readers (e.g., Kindle with interactive features), Automotive Infotainment Systems (e.g., Tesla touchscreen, Android Auto, Apple CarPlay), Drones with Controllers (e.g., DJI smart controllers), Wearable Health Devices (e.g., smart rings, advanced fitness trackers), Robots (e.g., social robots like Jibo, Pepper), Interactive Kiosks (e.g., airport check-in systems, mall directories), Industrial Handheld Devices (e.g., rugged tablets, barcode scanners with interactive screens), Medical Devices (e.g., smart glucometers, advanced hearing aids with apps), Smart Glasses (e.g., Ray-Ban Stories, Meta Quest Pro), Smart Appliances (e.g., refrigerators with interactive screens, washing machines with touch controls), Educational Toys (e.g., programmable robots like Sphero, Osmo kits), Smart Cameras with Displays (e.g., GoPro with touchscreen, baby monitors), Smart Wearables (e.g., AR headbands, biometric monitors), or any other form of a computer or a mobile device now known or to be developed in the future that is capable of running a program, accessing a network or querying a database, such as a remote database 130. As is well understood in the art of computer technology, and depending upon the technology, the performance of a computer-implemented method may be distributed among multiple computers and/or between multiple locations. On the other hand, in this presentation of the computing environment 100, detailed discussion is focused on a single computer, specifically the computer 102, to keep the presentation as simple as possible. Computer 102 may be located in a cloud, even though it is not shown in a cloud in FIG. 1. On the other hand, computer 102 is not required to be in a cloud except to any extent as may be affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B may be memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the disclosed methods"). These computer-readable program instructions are stored in various types of computer-readable storage media, such as the cache 114B and the other storage media discussed below. The program instructions, and associated data, are accessed by the processor set 114 to control and direct the performance of the disclosed methods. In computing environment 100, at least some of the instructions for performing the disclosed methods may be stored in the dynamic modification of the capture and authenticate human-generated invention code 120B in persistent storage 120.

The communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 118 is any type of volatile memory now known or to be developed in the future. Examples include dynamic type random access memory (RAM) or static type RAM. Typically, the volatile memory 118 is characterized by a random access, but this is not required unless affirmatively indicated. In computer 102, the volatile memory 118 is located in a single package and is internal to computer 102, but alternatively or additionally, the volatile memory 118 may be distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 may be a read-only memory (ROM), but typically at least a portion of the persistent storage 120 allows the writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the capture and authenticate human-generated invention code 120B typically includes at least some of the computer code involved in performing the disclosed methods.

The peripheral device set 122 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B may be persistent and/or volatile. In some embodiments of the disclosure, storage 122B may take the form of a quantum computing storage device for storing data in the form of qubits. In embodiments of the disclosure where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that can be used in Internet of Things applications. Other examples of peripheral devices include but are not limited to; Keyboards, Mice, External Monitors, Printers, Scanners, External Hard Drives, USB Flash Drives, Game Controllers, Joysticks, Steering Wheels, VR Controllers, Styluses, Digital Pens, Headphones, Earbuds, Microphones, Speakers, External Cameras, Webcams, Projectors, Docking Stations, External GPUs, Wireless Charging Pads, Power Banks, Smart Tags, Fitness Trackers, Smart Rings, MIDI Keyboards, Audio Interfaces, External CD/DVD Drives, Barcode Scanners, Smart Card Readers, External Sensors (e.g., temperature, motion), Robotics Kits, Drones, External Touchpads, Drawing Tablets, 3D Printers, Thermal Printers, External Memory Card Readers, Smart Watches, AR/VR Gloves, External Antennas, Hotspots, Monitors, Televisions, Smart Glasses, Augmented Reality (AR) Glasses, Virtual Reality (VR) Headsets, LED Displays, OLED Displays, Heads-Up Displays (HUDs), Interactive Whiteboards, Smart Displays, Digital Signage Screens, Touchscreen Panels, Holographic Displays, Wearable Displays (e.g., AR headbands), Large Format Displays (e.g., video walls), Transparent Displays, Portable Pico Projectors, Automotive Infotainment Screens, E-Paper Displays (e.g., E-Ink screens).

The network module 124 is the collection of computer software, hardware, and firmware that allows computer 102 to communicate with other computers through WAN 104. The network module 124 may include hardware, such as modems or Wi-Fi signal transceivers, software for packetizing and/or de-packetizing data for communication network transmission, and/or web browser software for communicating data over the internet. In some embodiments of the disclosure, network control functions, and network forwarding functions of the network module 124 are performed on the same physical hardware device. In other embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the disclosed methods can typically be downloaded to computer 102 from an external computer or external storage device through a network adapter card or network interface included in the network module 124.

The WAN 104 is any wide area network (for example, the internet) capable of communicating computer data over non-local distances by any technology for communicating computer data, now known or to be developed in the future. In some embodiments of the disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation would typically be communicated from the network module 124 of computer 102 through WAN 104 to EUD 106. In this way, the EUD 106 can display, or otherwise present recommendations to an end user. In some embodiments of the disclosure, EUD 106 may be a client device, such as a thin client, heavy client, mainframe computer, desktop computer, and so on.

The remote server 108 is any computer system that serves at least some data and/or functionality to the computer 102. The remote server 108 may be controlled and used by the same entity that operates the computer 102. The remote server 108 represents the machine(s) that collect and store helpful and useful data for use by other computers, such as the computer 102. For example, in a hypothetical case where the computer 102 is designed and programmed to provide a recommendation based on historical data, then this historical data may be provided to the computer 102 from the remote database 130 of the remote server 108.

The public cloud 110 is any computer system available for use by multiple entities that provides on-demand availability of computer system resources and/or other computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. Gateway 110A is the collection of computer software, hardware, and firmware that allows public cloud 110 to communicate through WAN 104.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in other embodiments of the disclosure, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

In an implementation, the system may include the processor set 114; a computer-readable storage media; and program instructions that are stored on the one or more computer-readable storage media. The program instructions are executable by the processor set to cause the processor set 114 to trigger a timestamp event associated with an initiation of an invention capture event. The program instructions further cause the processor set 114 to prompt a user to move a mobile device in a predetermined sequence of movements. The program instructions further cause the processor set 114 to receive data related to the predetermined sequence of movements. The mobile device includes an inertial measurement device such as an accelerometer configured to detect the predetermined sequence of movements. The program instructions further cause the processor set 114 to authenticate the user based on a successful detection of the predetermined sequence of movements. The program instructions further cause the processor set 114 to prompt the user to respond to a series of questions related to the invention in a multimodal format based on authentication of the user to capture the invention. The program instructions further cause the processor set 114 to record responses to each question in a set of separate sections, with each section being individually time stamped. The program instructions further cause the processor set 114 to store the responses in a database as a media file. Examples of the media file include but are not limited to a text file, an audio file, a video file, an image file, and an animation file. The media file includes a record of the invention capture event that includes either a time event or a date event.

Examples of the mobile device may include, but are not limited to, a computing device, a mainframe machine, a server, a computer work-station, a smartphone, a cellular phone, a mobile phone, a gaming device, a consumer electronic (CE) device, a head-mounted device, a Virtual Reality (VR) Headset, an Augmented Reality (AR) Device, a Mixed Reality (MR) Device, a Projection-based System, and/or any other device with computer vision display capabilities. Smartphone, Tablets, Smartwatches, Laptops, Desktop Computers, Smart TVs, Smart Displays (e.g., Google Nest Hub, Amazon Echo Show), Gaming Consoles (e.g., PlayStation, Xbox, Nintendo Switch), Handheld Gaming Devices (e.g., Steam Deck, Nintendo Switch Lite), Virtual Reality (VR) Headsets, Augmented Reality (AR) Glasses, Smart Home Hubs (e.g., Amazon Echo, Google Nest), E-Readers (e.g., Kindle with interactive features), Automotive Infotainment Systems (e.g., Tesla touchscreen, Android Auto, Apple CarPlay), Drones with Controllers (e.g., DJI smart controllers), Wearable Health Devices (e.g., smart rings, advanced fitness trackers), Robots (e.g., social robots like Jibo, Pepper), Interactive Kiosks (e.g., airport check-in systems, mall directories), Industrial Handheld Devices (e.g., rugged tablets, barcode scanners with interactive screens), Medical Devices (e.g., smart glucometers, advanced hearing aids with apps), Smart Glasses (e.g., Ray-Ban Stories, Meta Quest Pro), Smart Appliances (e.g., refrigerators with interactive screens, washing machines with touch controls), Educational Toys (e.g., programmable robots like Sphero, Osmo kits), Smart Cameras with Displays (e.g., GoPro with touchscreen, baby monitors), Smart Wearables (e.g., AR headbands, biometric monitors), or any other form of a computer or a mobile device now known or to be developed in the future that is capable of running a program, accessing a network or querying a database, such as a remote database 130

The display screen may include suitable logic, circuitry, and interfaces that may be configured to render the generated first alert. In some embodiments of the disclosure, the display screen may be an external display device associated with the first user device 204. The display screen may be a touch screen which may enable the first entity 218 to provide the first environment data via the display screen. The touch screen may be at least one of a resistive touch screen, a capacitive touch screen, or a thermal touch screen. In accordance with an embodiment of the disclosure, the display screen may refer to a display screen of a head-mounted device (HMD), a smart-glass device, a see-through display, a projection-based display, an electro-chromic display, or a transparent display. In some embodiments of the disclosure, the display screen may be realized through several known technologies such as, but are not limited to, at least one of Liquid Crystal Display (LCD) display, a Light Emitting Diode (LED) display, a plasma display, or an Organic LED (OLED) display technology, or other display devices.

In an embodiment, the program instructions further cause the processor set to present a set of graphical instructions on a display of the mobile device to guide the user through the predetermined sequence of movements during the authentication.

Examples of the predetermined sequence of movements include but are not limited to rotating the mobile device to the left, rotating the mobile device to the right, and flipping the mobile device 360 degrees.

In an embodiment, the program instructions further cause the processor set to determine the timestamp associated with the initiation of the invention capture event, the authentication, and the recorded responses to verify the invention capture event.

In an embodiment, the multimodal format comprising an audio format, a text format, and a video format. In other embodiments the format may include but are not limited to; Image files (e.g., PNG, JPEG, SVG), 3D models (e.g., OBJ, STL, FBX), Augmented Reality (AR) objects (e.g., USDZ, GLTF), Haptic feedback (e.g., vibration patterns), Virtual Reality (VR) environments (e.g., VRML, FBX), Interactive documents (e.g., PDFs with embedded multimedia), Animation files (e.g., GIF, FLV, SWF), Spatial audio files (e.g., Ambisonic formats like B-Format WAV), Data visualizations (e.g., interactive charts in JSON, D3.js), Live streams (e.g., RTMP, HLS), Mixed Reality (MR) experiences (e.g., immersive formats combining AR and VR), Sensor data streams (e.g., IoT data in JSON, CSV formats), Gesture input formats (e.g., Leap Motion data, motion-capture files like BVH), Tactile displays or braille formats (e.g., braille files for refreshable displays), Embedded interactive interfaces (e.g., HTML5 web applications), Audio-visual transcripts (e.g., SRT, VTT for subtitles and captions), Code snippets (e.g., Jupyter notebooks, Python scripts with outputs), Game files (e.g., Unity assets, Unreal Engine content), 360-degree videos (e.g., MP4 with 360 metadata), Emotion or biometric data (e.g., facial expression tracking files like Affectiva, heartbeat or EEG data formats).

In an embodiment, the program instructions further cause the processor set to prompt the user to submit visual evidence of the invention. In one embodiment, the user may submit images, drawings or figures in a format including but not limited to; Raster image files (e.g., PNG, JPEG, BMP, TIFF), Vector image files (e.g., SVG, EPS, AI, PDF), 3D model files (e.g., OBJ, STL, FBX, GLTF), CAD drawings (e.g., DWG, DXF, STEP), Architectural plans (e.g., IFC, RVT), Infographics (e.g., editable PSD, Canva templates), Technical diagrams (e.g., Visio files, SVG), Blueprint formats (e.g., DXF, DWF), Scientific figures (e.g., EPS, TIFF, MATLAB figures), Annotated images (e.g., PNG with overlay data), Geospatial maps (e.g., GeoTIFF, SHP), Hand-drawn sketches (e.g., scanned PNG, JPEG), Interactive charts or graphs (e.g., D3.js, Plotly files), Medical imaging formats (e.g., DICOM), Comics or storyboards (e.g., PNG, PSD, PDF), Presentation figures (e.g., PowerPoint slides, Keynote files), Annotated screenshots (e.g., PNG, JPEG), Layered design files (e.g., PSD, XCF), Illustration files (e.g., AI, SVG), High dynamic range images (e.g., HDR, EXR).

In an embodiment, the program instructions further cause the processor set to prompt the user to provide biometric data.

In an embodiment, the sensor (such as an inertial measurement device) is configured to detect and record movement data corresponding to the predetermined sequence of movements throughout the invention capture event. In an exemplary operation, during the invention capture event, the movement data is not predetermined for the capture process itself. However, it is predetermined for the authentication procedure, ensuring that while the user may move in an undetermined manner during capture, this movement remains consistent and verifiable as human movement, thereby aligning with the predetermined parameters for authentication.

In an embodiment, the movement data comprises a unique digital signature corresponding to the user movements detected in one or more axes during the invention capture event.

In implementation, the accelerometer data may be recorded throughout the idea capture event, enabling the detection of movement fluctuations as the inventor records an audio, text, or video file. Each movement generates a unique digital signature that can be associated with specific user actions, such as speaking, texting, or recording a video using their phone. The software application timestamps the captured audio, text, or video files and correlates these with the date, time, and duration of the accelerometer data, as well as the authentication procedure.

In another embodiment, during the audio, text, or video recording process, the system detects continuous movement using the device's inertial measurement unit as the phone is moved during the capture process and while answering questions. Movements detected from speaking into the phone while holding it to the ear generate a unique digital signature along the x, y, or z axes, which can be detected by the inertial measurement unit. Similarly, creating a response via video or texting produces distinct x, y, and z-axis digital signatures.

According to an embodiment herein, the system can distinguish between the digital signatures of various movements. Actions such as walking, running, placing the phone on a flat surface, picking it up, rotating it, or dropping it each create a unique accelerometer signature that the software can detect, analyze, and validate. The system can capture these movements in a single plane or across multiple planes of axes during the invention capture or authentication process.

Figure 2:
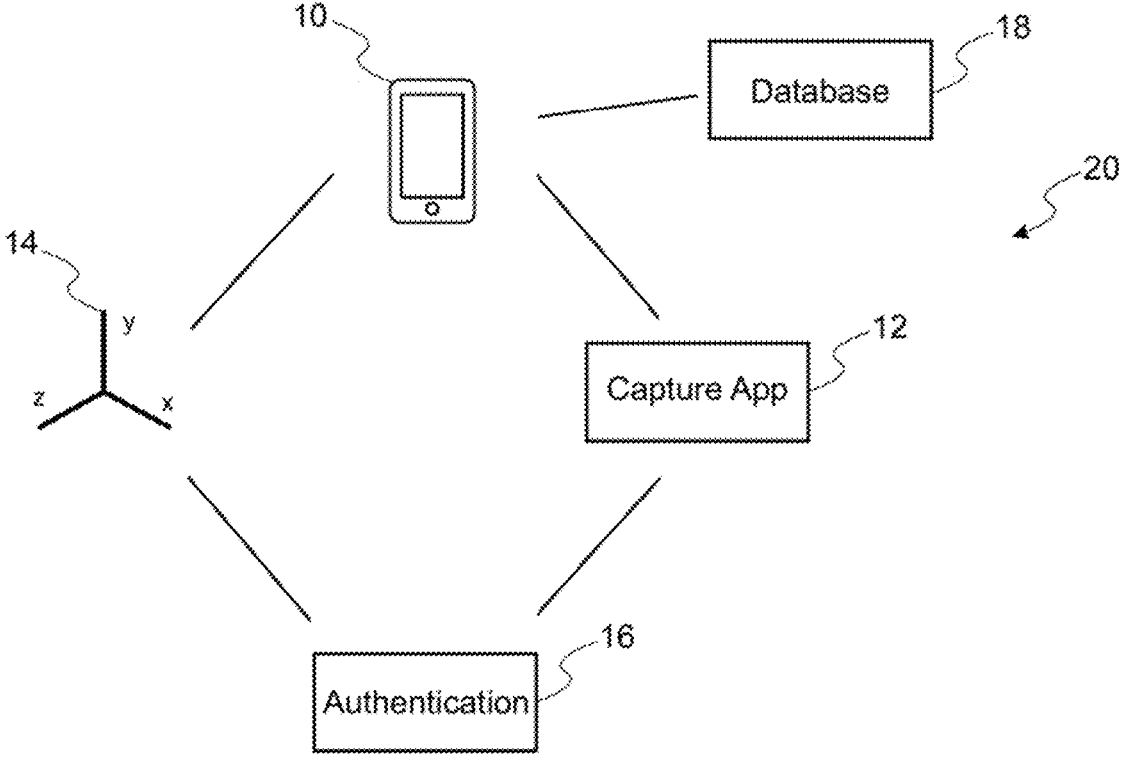
FIG. 2 is a diagram that illustrates an exemplary overview of the system, in accordance with an embodiment of the disclosure.

FIG. 2 is a diagram that illustrates an exemplary overview of the system 20, in accordance with an embodiment of the disclosure. FIG. 2 is explained in conjunction with elements from FIG. 1. System 20 includes a mobile device 10, an invention capture software program 12 installed on the mobile device, a sensor, such as an accelerometer, or inertial measurement unit 14 integrated into the mobile device, a user authentication procedure 16, and a secure database 18 for storing recorded date/time events and audio or text capture files. The mobile device 10 is any portable electronic device capable of capturing and recording information; in one embodiment, the mobile device is a smartphone. System 20 captures software program 12 and prompts the user to answer a series of questions related to the invention via audio, text, video, or any format mentioned above. The accelerometer 14 is used to sense device movement and record date/time events corresponding to the time of the invention capture event. The user authentication procedure 16 prompts the user to move the phone in a specific sequence, such as drawing a unique pattern on the touch-screen or performing a particular motion sequence. The software application authenticates the matching date/time and duration of the audio or text capture file. The recorded date/time events and audio or text capture files are stored in the secure database 18 for future reference. Movement of the mobile device 10 is detected by the accelerometer 14, which senses movements in the x, y, and z axes. During the invention capture event, the inventor may hold the phone and respond to a series of questions that prompt them to describe various aspects of their invention or idea. As the human inventor records answers in real time, fluctuations in the movement are recorded by the accelerometer. These movements represent unique digital signatures (in the x, y, and z directions), which can be verified and validated as indicators of movement and human interaction.

Figure 3:
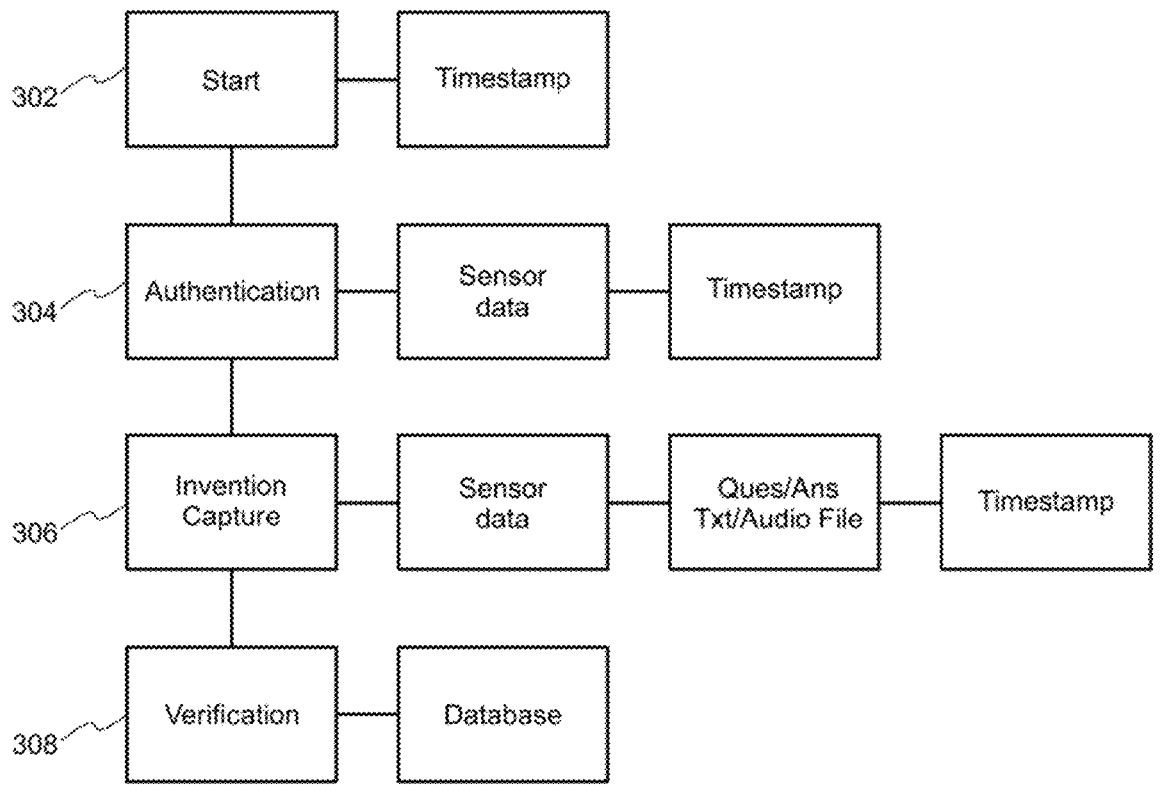
FIG. 3 is a block diagram that illustrates exemplary operations of the capturing and authentication process, in accordance with an embodiment of the disclosure.

FIG. 3 is a block diagram that illustrates exemplary operations of the capturing and authentication process, in accordance with an embodiment of the disclosure. FIG. 3 is explained in conjunction with elements from FIG. 1, and FIG. 2. According to an embodiment herein, the method includes initiating the invention capture process 302, where the user begins by clicking a "Start-Now" icon, initiating a timestamp event, and starting the invention capture process. The user may then be prompted to complete an authentication procedure 304. In one embodiment, the user is instructed to move the device in a random sequence (e.g., rotating the device to the left, then to the right, and then flipping it 360 degrees). A graphical instruction may also appear on the device screen to guide the user through the movement sequence. The system detects the movement using an accelerometer (or inertial measurement device). Once authentication is complete, the user proceeds to each section of the invention capture process 306, guided through a series of questions to elicit invention details. Each section of the invention capture is recorded, timestamped, and stored as a text file for further editing or as a record of the invention disclosure event, including time and date.

The system performs a validation or verification process 308 to match timestamp events, authentication procedures, and audio files stored in the database. In the described embodiment, the system uses a smartphone, laptop, or tablet as the capture device, although other devices with accelerometers or other sensing systems were previously described. In one embodiment, the smartwatch may have an invention capture software program, an accelerometer, and a user authentication procedure similar to those described above. Other compatible devices could include specialized keyboards, drawing tablets, or any tool requiring manual input from the inventor. Devices like smart wearables, smart glasses, or smart rings can also verify time/date events in combination with the software application. Peripheral devices such as those discussed above, wearable peripherals, and other mobile or computer devices with sensors such as inertial measurement units may track and record the dates and times of capture events.

In one preferred embodiment, the system prompts the user to answer questions divided into sections covering aspects of the invention, such as title, background, detailed description, field, market, advantages, existing prior art, novel features, and sketches or drawings. The user may respond via audio, text, or video, which can be transcribed to text for content review or editing.

In another embodiment, the system supports capturing multiple inventors, using voice, image, or video recognition software to differentiate contributors.

Prior to the idea capture event, the user completes an authentication procedure to verify human involvement, which may include moving the phone in a specific sequence. In some cases, the system may display a counter, prompting the user to stop it at a specified digit, or ask the user to drag their finger on the touchscreen in a specific sequence.

During the audio recording, the system detects continuous movement via the inertial measurement unit as the user interacts with the device, producing a unique digital signature in the x, y, or z axes. These signatures can distinguish between different types of movement, such as walking, placing the phone on a surface, or rotating it, which the software can analyze and validate.

In one embodiment, the system prompts the user to submit visual evidence of the invention, such as sketches or drawings. The user can also submit biometric data as part of the capture process including but not limited to biometric systems for human identification; fingerprint recognition, facial recognition, iris recognition, retina scanning, voice recognition, hand geometry recognition, palm vein recognition, DNA analysis, signature recognition, behavioral biometrics (e.g., typing patterns, gait analysis), ear shape recognition, Odor or scent recognition. Facial Liveness Detection Methods; Passive Liveness Detection, Active Liveness Detection, 3D Depth Sensing, Skin Texture Analysis, Thermal Imaging, AI-Based Techniques.

Additional mobile device features, like the front, rear, or depth cameras, may be activated to authenticate the inventor's location and activity. GPS may also be used for location verification.

In another embodiment, the mobile device may use a capacitance touchscreen to validate human interaction through electrical charges generated upon contact. This can be used for authentication during the capture event.

The system can also capture and authenticate other documents verifying the inventor's identity, including legally binding documents like non-disclosure agreements (NDAs), and invention disclosure documents by recording their specific timestamps.

In some embodiments, the system generates digital files with timestamps to document when an idea capture event begins and ends, linked to the accelerometer (or sensor) data, user authentication events, and digital file captures. For long-duration projects, the system can consolidate timestamps, authentication, and accelerometer data, validating these events consistently.

Supported digital file formats include text (e.g., .TXT, .DOC), audio (e.g., MP3), video (e.g., .MP4), image (e.g., .JPEG), and others, including specialized formats like .STL for 3D models.

In one embodiment, the accelerometer measures motion in multiple axes (x, y, and z), with some sensors also measuring rotation. Additional sensors, such as barometers, fingerprint readers, and gyroscopes, may also be used individually or in combination. Examples of the sensors include but are not limited to magnetometer, proximity sensor, ambient light sensor, barometer, fingerprint sensor, face recognition sensor, hall sensor, thermometer, humidity sensor, ultrasonic sensor, heart rate sensor, Infrared (IR) Blaster, Time of Flight (ToF) sensor, LiDAR (Light Detection and Ranging), dual-pixel or depth sensor, gas sensor, electrocardiogram (ECG) sensor, microphone array, multi-spectral sensor.

In another embodiment, a protective outer case with electroconductive properties can detect user interaction during the capture process. An activation button on the case may initiate the capture software, and the case may contain embedded sensors to aid in authentication.

The system may incorporate AI to analyze audio or text inputs and suggest ways to improve the invention. The AI could help draft patent documents or generate figures for documents. A language model on the device may dynamically question the inventor based on responses to improve invention capture. In one embodiment, a generative AI model such as a small or large language model may integrate with the idea capture application and sit locally on a user's smartphone or the generative AI may sit in the cloud or other easily accessible database. The generative AI Idea capture system offers further customization with domain knowledge expertise in specific areas of interest and relevance to the field of use of the invention. These systems could be fine-tuned (Retrieval augmented generation/knowledge graph or other fine tuning) to draft intellectual property related documentation including but not limited to; Patents, Patent Applications, Copyright Registrations, Trademark Registrations, Trademark Applications, Trade Dress Documentation, Trade Secret Agreements, Non-Disclosure Agreements (NDAs), Intellectual Property Assignment Agreements, Licensing Agreements, Software Licenses, Open Source Licenses, Royalty Agreements, Invention Disclosures, Prior Art Documentation, Technology Transfer Agreements, Intellectual Property Valuation Reports, Domain Name Registrations, Franchise Agreements, Brand Guidelines, IP Portfolio Reports, Cease and Desist Letters, Litigation Documents (e.g., claims, court filings), Joint Development Agreements (JDAs), Collaboration Agreements, Confidentiality Agreements, Research and Development Agreements, Material Transfer Agreements (MTAs), User Manuals (for copyright or patent purposes), Design Patent Applications, Industrial Design Registrations, Utility Model Registrations, Database Right Registrations, Moral Rights Statements, Fair Use Documentation, Copyright Assignment Agreements, Publication Agreements, IP Audit Reports, International Registration Documents (e.g., WIPO filings), Enforcement Notices, Termination of IP Rights Notices, Freedom to Operate Opinions, Patent Landscape Analysis Reports, Clearance Search Reports, Risk Assessment Documents, Patent Infringement Analysis, Competitor IP Monitoring Reports, Licensing Agreements (to address potential overlaps), Cross-Licensing Agreements, IP Due Diligence Reports, Non-Infringement Opinions, Invalidity Search Reports, Design-Around Documentation, Legal Opinions on Jurisdictional Patent Rights, Regulatory Approval Documentation (e.g., FDA, CE mark with IP considerations), Letters of Consent (from IP holders), Technology Acquisition Agreements, Evidence of Use Documentation (to show prior rights or practices), IP Ownership Verification Records, Market Clearance Strategies, Contractual Agreements Limiting Liability, Invention Disclosure Reviews, Portfolio Optimization Plans. In one embodiment, the system captures an idea or invention and drafts a patent search query. The search query may include keywords and phrases, synonyms and variations, Boolean operators, grouping with parentheses, field-specific searches, classification codes (relevant IPC and CPC), wildcards and truncations, language and translations, and iterative refinement. The system may perform a search of the relevant patent databases, either manually entered or through an application programming interface (API).

Some embodiments include a virtual reality attorney to guide users through the invention capture. Blockchain technology may securely store captured data, ensuring the integrity of time-stamped events and audio/text files.

The system's translation services allow the invention capture to be translated into a preferred language (e.g., English, French, German) before submission to a patent office. The system is not limited to any one language and could produce any of the documents listed above in any language.

FIG. 4 is a flowchart that illustrates a method 400 for capturing and authenticating human-generated inventions, in accordance with an embodiment of the disclosure. FIG. 4 is explained in conjunction with elements from FIG. 1, FIG. 2, and FIG. 3. The operations of the exemplary method may be executed by any computing system, for example, by the computer 102 of FIG. 1. The computer-implemented method 400 includes a step 402 of triggering, by a computer, a timestamp event associated with an initiation of an invention capture event. The computer-implemented method 400 further includes a step 404 of prompting, by the computer, a user to move a mobile device in a predetermined sequence of movements. The computer-implemented method 400 includes a step 406 of receiving, by the computer, data related to the predetermined sequence of movements. Examples of the predetermined sequence of movements include but are not limited to rotating the mobile device to the left, rotating the mobile device to the right, and flipping the mobile device 360 degrees. The mobile device includes an inertial measurement device configured to detect the predetermined sequence of movements. The computer-implemented method 400 further includes a step 408 of authenticating, by the computer, the user based on a successful detection of the predetermined sequence of movements. The computer-implemented method 400 includes a step 410 of prompting, by the computer, the user to respond to a series of questions related to the invention in a multimodal format based on authentication of the user to capture the invention. Examples of the multimodal format include but are not limited to an audio format, a text format, and a video format. In an embodiment, the inertial measurement device is configured to detect and record movement data corresponding to the predetermined sequence of movements throughout the invention capture event. The computer-implemented method 400 includes a step 412 of recording, by the computer, responses to each question in a set of separate sections, with each section being individually timestamped. The computer-implemented method 400 further includes a step 414 of storing, by the computer, the responses in a database as a media file. Examples of the media file include but are not limited to a text file, an audio file, a video file, an image file, and an animation file. The media file includes a record of the invention capture event comprising at least one of a time event and a date event. The computer-implemented method 400 further includes a step 416 of presenting, by the computer, a set of graphical instructions on a display of the mobile device to guide the user through the predetermined sequence of movements during the authentication. The computer-implemented method 400 further includes a step 418 of determining the timestamp associated with the initiation of the invention capture event, the authentication, and the recorded responses to verify the invention capture event. The computer-implemented method 400 further includes a step 420 of prompting, by the computer, the user to submit visual evidence of the invention. The computer-implemented method 400 further includes a step 422 of prompting, by the computer, the user to provide biometric data. The computer-implemented method 400 further includes a step 424 of generating a unique digital signature based on the movement data detected by the accelerometer. The computer-implemented method 400 further includes a step 426 of associating the movement data with a timestamp corresponding to the invention capture event. The computer-implemented method 400 further includes a step 428 of differentiating the unique digital signature to identify a set of user actions that include but are not limited to talking into the mobile device while holding the mobile device; texting; and recording video, based on the pattern of detected movement data along one or more of an x-axis, a y-axis, and a z-axis.

Various embodiments of the disclosure may provide a non-transitory computer readable medium and/or storage medium having stored thereon, instructions executable by a machine and/or a computer to operate a system 20 (e.g., the computer system) for capturing and authenticating human-generated inventions. The instructions may cause the machine and/or computer to perform operations that include triggering a timestamp event associated with the initiation of an invention capture event. The operations further include prompting a user to move a mobile device in a predetermined sequence of movements. The operations further include receiving data related to the predetermined sequence of movements. The mobile device includes a sensor or an inertial measurement device that is configured to detect the predetermined sequence of movements. The operations further include authenticating the user based on a successful detection of the predetermined sequence of movements. The operations further include prompting the user to respond to a series of questions related to the invention in a multimodal format based on the authentication of the user to capture the invention. The operations further include recording responses to each question in a set of separate sections, with each section being individually timestamped. The operations further include storing the responses in a database as a media file. Examples of the media file include but are not limited to a text file, an audio file, a video file, an image file, and an animation file. The media file includes a record of the invention capture event comprising at least one of a time event and a date event.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a mobile device comprising an accelerometer;

a processor set;

one or more computer-readable storage media; and program instructions stored on the one or more computer-readable storage media, the program instructions executable by the processor set to cause the processor set to:

prompt a user to use the mobile device to respond to a series of questions in at least one of a text format, an audio format, or a video format;

store the responses to the series of questions as a media file;

receive data from the accelerometer corresponding to incidental movements of the mobile device caused by the user responding to the series of questions; and process the data from the accelerometer and the media file by:

applying digital timestamps to the media file whereby an individual digital timestamp is applied to each response to each of the series of questions;

applying digital timestamps to the data from the accelerometer whereby an individual digital timestamp is applied to each instance of incidental movements of the mobile device; and matching the digital timestamps of the media file to the digital timestamps of the data from the accelerometer to correlate responses to the series of questions with instances of comparatively high acceleration of the mobile device to thereby authenticate that a human user used the mobile device when responding to the series of questions.

2. The system of claim 1, wherein the at least one format is a multimodal format comprising an audio format, a text format, and a video format.

3. The system of claim 1, wherein the program instructions further cause the processor set to prompt the user to submit visual evidence of an invention.

4. The system of claim 1, wherein the program instructions further cause the processor set to prompt the user to provide biometric data.

5. The system of claim 1, wherein the accelerometer is configured to detect and record the data corresponding to the incidental movements of the mobile device throughout the user responding to the series of questions.

6. The system of claim 5, wherein the data corresponding to the incidental movements of the mobile device comprises a unique digital signature corresponding to the user movements detected in one or more axes during the invention capture event.

7. A computer-implemented method, comprising:

prompting, by the computer, a user to use a mobile device to respond to a series of questions in at least one of a text format, an audio format, or a video format;

storing the responses to the series of questions as a media file;

receiving, by an accelerometer, data corresponding to incidental movements of the mobile device caused by the user responding to the series of questions; and processing the data from the accelerometer and the media file by:

applying digital timestamps to the media file whereby an individual digital timestamp is applied to each response to each of the series of questions;

applying digital timestamps to the data from the accelerometer whereby an individual digital timestamp is applied to each instance of incidental movements of the mobile device; and matching the digital timestamps of the media file to the digital timestamps of the data from the accelerometer to correlate responses to the series of questions with instances of comparatively high acceleration of the mobile device to thereby authenticate that a human user used the mobile device when responding to the series of questions.

8. The computer-implemented method of claim 7, further comprising prompting, by the computer, the user to submit visual evidence of an invention.

9. The computer-implemented method of claim 7, further comprising prompting, by the computer, the user to provide biometric data.

10. The computer-implemented method of claim 7, wherein the at least one format is a multimodal format comprising an audio format, a text format, and a video format.

11. The computer-implemented method of claim 7, wherein the accelerometer is configured to detect and record the data corresponding to the incidental movements of the mobile device throughout the user responding to the series of questions.

12. The computer-implemented method of claim 11, further comprising:

generating, by the computer, a unique digital signature based on the data detected by the accelerometer; and associating, by the computer, the data detected by the accelerometer with the timestamps corresponding to the user responding to the series of questions.

13. The computer-implemented method of claim 12, further comprising:

differentiating, by the computer, the unique digital signature to identify a set of user actions comprising:

talking into the mobile device while holding the mobile device;

texting; and recording video, based on the pattern of detected movement data along one or more of an x-axis, a y-axis, and a z-axis.

14. A computer program implemented as non-transitory program instructions stored in a computer-readable storage media of a mobile device, the mobile device comprising:

a processor set; and an accelerometer, wherein execution of the non-transitory program instructions by the processor set causes the processor set to:

prompt a user to respond to a series of questions in at least one of a text format, an audio format, or a video format;

store the responses to the series of questions as a media file;

receive data from the accelerometer corresponding to incidental movements of the mobile device caused by the user responding to the series of questions; and process the data from the accelerometer and the media file by:

applying digital timestamps to the media file whereby an individual digital timestamp is applied to each response to each of the series of questions;

applying digital timestamps to the data from the accelerometer whereby an individual digital timestamp is applied to each instance of incidental movements of the mobile device; and matching the digital timestamps of the media file to the digital timestamps of the data from the accelerometer to correlate responses to the series of questions with instances of comparatively high acceleration of the mobile device to thereby authenticate that a human user used the mobile device when responding to the series of questions.

\* \* \* \* \*